United States Patent Office 3,541,160
Patented Nov. 17, 1970

3,541,160
PREPARATION OF BIS(2-FLUORO-2,2-DINITROETHYL)FORMAL
Mortimer J. Kamlet, London, England, assignor to the United States of America as represented by the Secretary of the Navy
No Drawing. Filed Dec. 4, 1962, Ser. No. 243,196
Int. Cl. C07c *41/00, 43/12*
U.S. Cl. 260—615        7 Claims The invention described herein may be manufactured and used by or for the Government of the United States of America for governmental purposes without the payment of any royalties thereon or therefor.

This invention relates to novel methods of preparing energetic plasticizers for rubbery explosive and propellant compositions. More particularly, it is directed to novel methods of preparing bis(2-fluoro-2,2-dinitroethyl)formal.

Previous methods for the preparation of bis(2-fluoro-2,2-dinitroethyl)formal are not only expensive but are inefficient due to the high concomitant formation of undesirable side products and tedious, time consuming recovery methods.

It has now been found that bis(2-fluoro-2,2-dinitroethyl)formal may be efficiently and inexpensively prepared by fluorination of the corresponding metal salts of bis(2,2-dinitroethyl)formal such as bis(2-alkali metal-2,2-dinitroethyl)formal, such metal salts being the subject matter of copending application Ser. No. 220,944, filed Aug. 29, 1962, now U.S. Pat. No. 3,373,209.

Accordingly, it is an object of this invention to provide novel methods for preparing bis(2-fluoro-2,2-dinitroethyl) formal.

Another object of the invention is the provision of a method for fluorinating bis(2-alkali metal-2,2-dinitroethyl)formals utilizing elemental fluorine.

Another object of the invention is the provision of a method for fluorinating bis(2-alkali metal-2,2-dinitroethyl)formal utilizing perchloryl fluoride.

Fluorination of bis(2-alkali metal-2,2-dinitroethyl) formal according to the invention includes the utilization of elemental fluorine in water and of perchloryl fluoride in methanol-water.

ELEMENTAL FLUORINE METHOD

In this embodiment of the invention, a mixture of the bis(2-alkali metal-2,2-dinitroethyl)formal is admixed with a solvent to form a solution or partially dissolved suspension and a mixture of nitrogen and fluorine is bubbled through the admixture of formal and solvent. Bis(2-fluoro-2,2-dinitroethyl)formal is recovered.

PERCHLORYL FLUORIDE METHOD

In this embodiment of the invention, the solution or partially dissolved suspension of bis(2-alkali metal-2,2-dinitroethyl)formal and solvent is treated with gaseous perchloryl fluoride. Bis(2-fluoro-2,2-dinitroethyl)formal is recovered.

STARTING MATERIALS

The bis(2-alkali metal-2,2-dinitroethyl)formals fluorinated by the embodiments described above are prepared by:

(1) Admixture of a solution of alkali metal hydroxide in alcohol with a solution of bis(2,2-trinitroethyl)formal in hydrogen peroxide, or (2) Admixture of a solution of bis(2,2,2-trinitroethyl) formal with a slurry of alkali metal hydroperoxide in methanol-water.

The above-described methods of preparation of the starting compounds employed in the methods of this invention are more fully set forth in copending application Ser. No. 220,944, filed Aug. 29, 1962, now U.S. Pat. No. 3,373,209.

Preparation of bis(2,2,2-trinitroethyl)formal is set forth in copending application Ser. No. 173,592, filed Feb. 15, 1962.

The bis(2-fluoro-2,2-dinitroethyl)formal prepared by the methods of this invention is a derivative of bis(2-alkali metal-2,2-dinitroethyl)formals such as bis(2-sodium-2,2-dinitroethyl)formal, bis(2 - potassium - 2,2-dinitroethyl) formal and bis(2-lithium-2,2-dinitroethyl)formal.

GENERAL PROCEDURE

Bis(2-alkali metal-2,2-dinitroethyl)formal is admixed with solvent and a mixture of $N_2/F_2$ or, in lieu thereof, perchloryl fluoride is bubbled through the resulting solution at a constant temperature. As the reaction proceeds the solution will be seen to turn from yellow to deep yellow to milky white at end point. The solution is then cooled, extracted and washed.

In the recovery of the bis(2-alkali metal-2,2-dinitroethyl)formal, as in the first section of Example 1, the dimetallic salt precipitate must be kept wet after the first alcohol wash and prior to commencement of the fluorination procedure, with the exception that it may be used dry, with caution, if after the first alcohol wash the precipitate is placed in water, warmed to dissolve and allowed to reprecipitate upon cooling to ambient temperature. After reprecipitation the solid may be filtered, washed again with methanol and dried at room temperature in a vacuum dessicator. The dry material has an impact sensitivity of 34 cm., $\delta=0.12$.

The fluorination temperature is preferably from about 5° C. to about 25° C. although temperatures ranging downward to the freezing point of the solution may be used. Obviously, however, such lower temperatures would affect the efficiency of the reaction. Higher temperatures may also be used so long as the reaction does not increase to an uncontrollable rate.

The fluorine or perchloryl fluoride input is continued until the color of the reaction mixture changes, evidencing completion at the reaction. When using elemental fluorine, nitrogen or any inert gas is introduced in admixture therewith in concentrations of from about 1:1 to 5:1, $N_2:F_2$. Since the perchloryl fluoride reacts more slowly than the elemental fluorine, admixture with nitrogen is unnecessary.

Buffering agents such as sodium acetate, sodium carbonate and sodium bicarbonate may be utilized to control pH, the end point being preferably about pH 5–6. The buffers may be added to the solution prior to fluorination or incrementally during fluorination.

The following examples illustrate specific embodiments of the invention but it is to be understood that it is not intended that the scope of the invention should be restricted thereby.

EXAMPLE 1

To 30 g. of bis(2,2,2-trinitroethyl) formal in 225 ml. methanol at 0° C. was added 45 ml. cold 30% hydrogen peroxide, followed by the dropwise addition of 36 g. potassium hydroxide (85%) in 210 ml. methanol, the temperature being kept below about 10° C. Bis(potassium-2,2-dinitroethyl)formal was formed as a yellow precipitate and was washed three times with 100 ml. portions of methanol (CAUTION—THE PRECIPITATE SHOULD NOT BE ALLOWED TO BECOME DRY AT THIS POINT).

The methanol - wet bis(potassium - 2,2 - dinitroethyl)- formal was suspended in a solution of 10 g. sodium carbonate in 500 ml. water and the mixture was concentrated, at a temperature of 50° C., to a total volume of 400 ml. Introduction of elemental fluorine admixed with nitrogen in a ratio of 1:3.75 was initiated and the fluorination was maintained for 100 minutes at a temperature of 23–25° C., the temperature being held constant by means of an ice water bath. As fluorination proceeded, the original yellow color of the mixture deepened but was milky white at end point.

The mixture was cooled to 5° C. and extracted with 200 ml. chloroform. The aqueous phase was then extracted with an additional 100 ml. of chloroform and the combined extracts were washed first with 5% aqueous sodium hydroxide and then with water. The product consisted of 14.11 g. (55% of theoretical) of bis(2-fluoro-2,2-dinitroethyl)formal in the form of a very pale chartreuse oil.

Further examples are shown in Table I.

TABLE I.—FLUORINATION OF BIS(POTASSIUM-2,2-DINITROETHYL) FORMAL
[400 mls. $H_2O$]

| Experiment | pH control | Temp. (° C.,) | Time (min.) | $N_2/F_2$ ratio | Yield Grams | Yield Percent |
|---|---|---|---|---|---|---|
| 2 | 10 gms. $Na_2CO_3$ | 5–6 | 75 | 3.75/1 | 12.05 | 47.0 |
| 3 | 10 gms. $Na_2CO_3$ | 23–25 | 90 | 3.75/1 | 14.11 | 55.0 |
| 4 | 10 gms. $NaHCO_3$ | 23–25 | 90 | 4/1 | 14.13 | 55.2 |

EXAMPLE 5

To a well stirred solution of 17.4 g. 97.8% sodium hydroxide in 150 ml. methanol at 10° C. were added 50 ml. of 27.5% hydrogen peroxide. Fifty ml. water were added to thin the slurry and the mixture was cooled to 5° C. With continued stirring a solution of 30 g. bis(2,2,2-trinitroethyl)formal in 150 ml. methanol was added dropwise over a 30 minute period. With continued cooling the mixture was stirred an additional two hours.

A solution of 10 g. sodium bicarbonate in 550 ml. water was then added portionwise as the solution was concentrated to a total volume of 400 ml., the temperature during this step not being allowed to exceed 40° C. The yellow solution, analyzed spectrophotometrically at this point, was found to contain 95% of the theoretical amount of bis(sodium-2,2-dinitroethyl)formal.

As in the preceding example, introduction of elemental fluorine was initiated and maintained for 80 minutes after which time a milky white end point was reached. The fluorination temperature was 8–10° C. and the fluorine:nitrogen ratio was 1:3.

The product (recovered as in the preceding example) consisted of 15.04 g. of bis(2-fluoro-2,2-dinitroethyl)formal (58.8% of theoretical).

Further examples are illustrated in Table II.

TABLE II.—FLUORINATION OF BIS(SODIUM-2,2-DINITROETHYL)FORMAL
[400 mls. $H_2O$]

| Experiment | pH control | Temp., (° C.) | Time, (min.) | $N_2/F_2$ ratio | Yield Grams | Yield Percent |
|---|---|---|---|---|---|---|
| 6[1] | 15 gms. $NaHCO_3$ | 8–10 | 150 | 4/1 | 15.8+ | 41+ |
| 7 | 20 gms. $NaHCO_3$ | 5–8 | 120 | 2/1 | 20.6 | 53.0 |
| 8 | 15 gms. $Na_2CO_3$ | 8–10 | 80 | 1.5/1 | 18.1 | 49.1 |

[1] A quantity of product lost by spillage during work-up.

EXAMPLE 9

To 9.7 g. of the methanol-wet fiber cake of bis(2-potassium-2,2-dinitroethyl)formal prepared as in paragraph 1 of Example 1 was added 100 ml. methanol and perchloryl fluoride was bubbled through the solution at a temperature of 40° C. Input of perchloryl fluoride was continued slowly overnight with no stirring and there was obtained an orange solution containing a solid. To the orange solution was added 150 ml. water to dissolve the salt and the solution was extracted with ethyl ether and washed sequentially with water, 5% sodium carbonate and 5% potassium chloride. The solution was dried over Drierite and, upon removal of solvent, there was obtained a small amount of bis(2-fluoro-2,2-dinitroethyl)formal as an amber oil.

Obviously many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States is:

1. The method of preparing bis(2-fluoro-2,2-dinitroethyl)formal which comprises admixing the corresponding metal salt of a bis(dinitroethyl)formal with an inert solvent and contacting the mixture with a fluorinating agent selected from the group consisting of fluorine and perchloryl fluoride.

2. The method of preparing bis(2-fluoro-2,2-dinitroethyl)formal which comprises admixing an alkali metal salt of a bis(dinitroethyl)formal with an inert diluent and contacting the mixture with a fluorinating agent selected from the group consisting of fluorine and perchloryl fluoride.

3. The method of preparing bis(2-fluoro-2,2-dinitroethyl)formal which comprises admixing an alkali metal salt of a bis(dinitroethyl)formal and a buffering agent with an inert diluent and introducing a gaseous fluorinating agent selected from the group consisting of fluorine and perchloryl fluoride into said mixture.

4. The method of claim 3 wherein the alkali metal is lithium.

5. The method of claim 3 wherein the alkali metal is sodium.

6. The method of claim 3 wherein the alkali metal is potassium.

7. The method of preparing bis(2-fluoro-2,2-dinitroethyl)formal which comprises admixing a bis(alkali metal dinitroethyl)formal with an inert solvent, introucing a gaseous fluorinating agent selected from the group consisting of fluorine and perchloryl fluoride into the mixture and incrementally adding a buffering agent to the mixture during said fluorination.

References Cited

UNITED STATES PATENTS 3,291,833  12/1966  Gold et al. _____ 260—615 X

LELAND A. SEBASTIAN, Primary Examiner

U.S. Cl. X.R.

149—88